United States Patent [19]

Haneda et al.

[11] Patent Number: 5,380,610
[45] Date of Patent: Jan. 10, 1995

[54] IMAGE FORMING APPARATUS

[75] Inventors: Satoshi Haneda; Masakazu Fukuchi; Tadashi Miwa, all of Hachioji, Japan

[73] Assignee: Konica Corporation, Tokyo, Japan

[21] Appl. No.: 262,038

[22] Filed: Jun. 17, 1994

Related U.S. Application Data

[63] Continuation of Ser. No. 23,139, Feb. 24, 1993, abandoned, which is a continuation of Ser. No. 701,208, May 16, 1991, abandoned.

[30] Foreign Application Priority Data

May 21, 1990 [JP] Japan ................... 2-130833
May 30, 1990 [JP] Japan ................... 2-140236

[51] Int. Cl.$^6$ ................... G03G 15/32; G03G 13/04
[52] U.S. Cl. ................... 430/31; 430/54; 430/46
[58] Field of Search ................... 430/31, 46, 54

[56] References Cited

U.S. PATENT DOCUMENTS

| | | | |
|---|---|---|---|
| 4,563,408 | 1/1986 | Lin et al. | 430/59 |
| 4,821,065 | 4/1989 | Ishii et al. | 346/160 |
| 5,025,272 | 6/1991 | Haneda et al. | 346/153.1 |
| 5,172,132 | 12/1992 | Haneda et al. | 346/1.1 |
| 5,252,415 | 10/1993 | Yoshizawa et al. | 430/31 |
| 5,255,014 | 10/1993 | Haneda et al. | 346/108 |

FOREIGN PATENT DOCUMENTS

| | | |
|---|---|---|
| 0264886 | 4/1988 | European Pat. Off. . |
| 0271178 | 6/1988 | European Pat. Off. . |
| 0338962 | 10/1989 | European Pat. Off. . |
| 63-44662 | 2/1988 | Japan . |

Primary Examiner—Marion E. McCamish
Assistant Examiner—Laura S. Weiner
Attorney, Agent, or Firm—Frishauf, Holtz, Goodman & Woodward

[57] ABSTRACT

The invention provides a method of forming an image on an imaging surface of a photoreceptor having a light decay characteristic so that the potential of the imaging surface is slowly decayed in an initial period of exposure and the potential of the imaging surface is sharply decayed in a middle period of exposure. The imaging surface is charged to an electric potential, exposed with a light beam, wherein the light beam has the maximum light amount $I_0$ in the light amount distribution thereof on the imaging surface so as to satisfy following condition:

$$1.2 \times P_{178} \leq I_0 \leq 2.5 \times P_{\frac{1}{2}},$$

in which $P_{\frac{1}{2}}$ is a half decay exposure light amount for decaying the potential of the imaging surface from an initial potential value before the exposure to the half of the initial potential value.

10 Claims, 12 Drawing Sheets

FIG. 7
(a) 
(b) 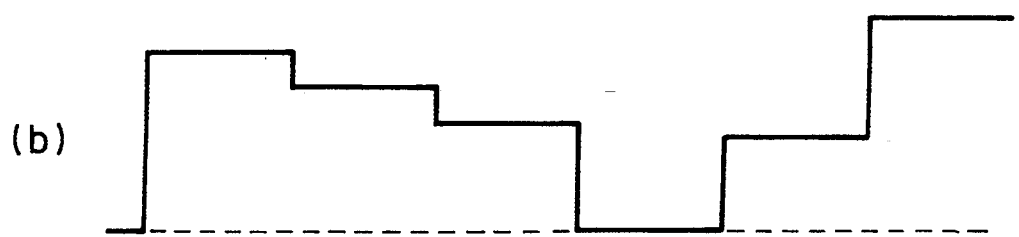
(c) 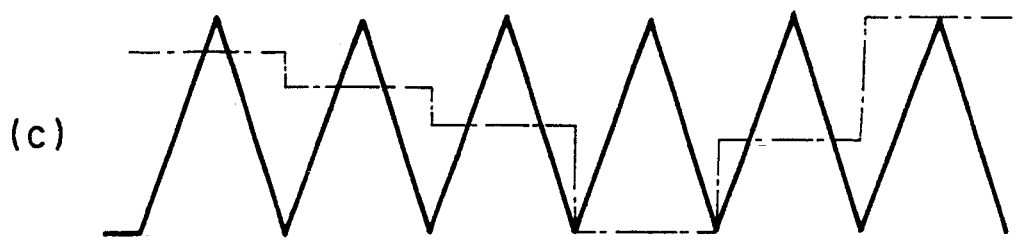
(d) 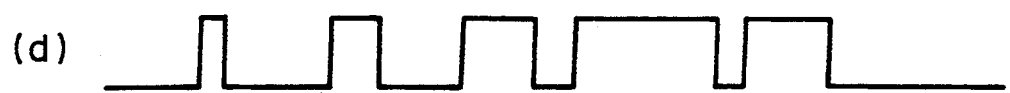
(e) 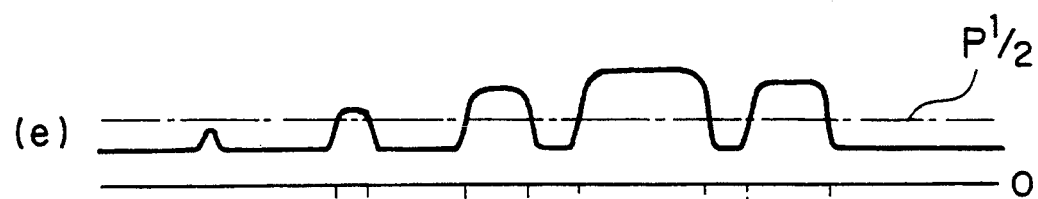
(f) 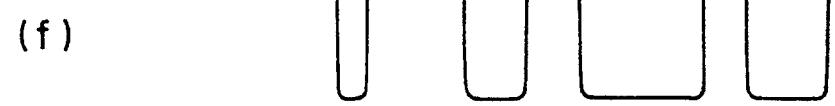

FIG. 15
(a)
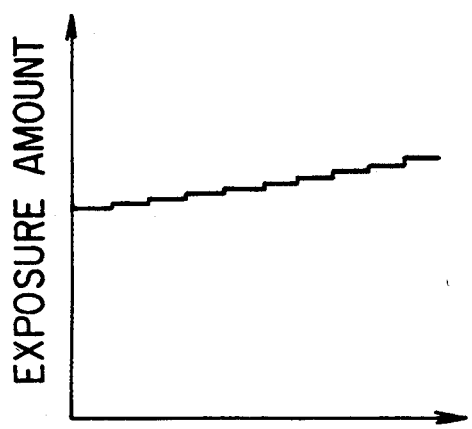
(b)
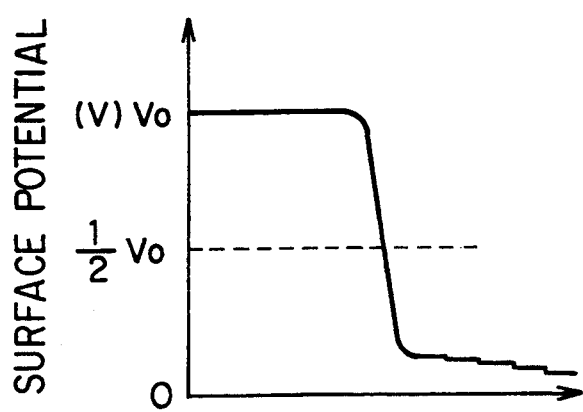

IMAGE FORMING APPARATUS

This application is a continuation of application Ser. No. 08/023,139, filed Feb. 24, 1993, now abandoned, which is a continuation of Ser. No. 07/701,208, filed May 16, 1991 (now abandoned).

BACKGROUND OF THE INVENTION

The present invention relates to an electrophotographic image forming apparatus, and more particularly relates to an image forming apparatus which forms an electrostatic latent image on a high $\gamma$ photoreceptor by a modulated light beam which has been modulated according to digital image data sent from a computer.

Recently, in the field of electrophotography in which an electrostatic latent image is formed on a photoreceptor and the latent image is developed so that a visual image can be obtained, a digital system of image forming has been actively investigated by which improvements, conversion and editing of images are easily conducted so that image forming of high quality is possible.

An optical scanning system which directly modulates the laser intensity utilizing a semiconductor laser, is used for modulation conducted according to the signal sent from a computer or a document in this image forming apparatus. A dot-shaped exposure is conducted on a photoreceptor, which has been charged uniformly beforehand, by the aforementioned optical scanning system so that a dot-shaped image can be formed.

The section of a beam which is illuminated by the aforementioned optical scanning system, is circular or oval, and its luminance distribution is similar to a normal distribution, both ends of which are spread to the right and left. For example, in the case of a semiconductor laser beam, the luminance is usually 1–6 mW, and its section on a photoreceptor is a very narrow circle or oval of which one or both of the primary and subsidiary scanning lengths is 20–100 μm.

FIG. 10 is a schematic illustration showing the outline of the characteristic of a low $\gamma$ type photoreceptor.

A low $\gamma$ type of photoreceptor in which light decay is sharp in the beginning of exposure and gentle in the middle of exposure as shown in FIG. 2a, has been used as a photoreceptor which is applied to an electrophotographic image forming apparatus.

Concerning the low $\gamma$ type of photoreceptor, the following have been widely known: a mono-layer type such as Se, CdS and the like; and a two-layer type composed of an electric charge generating layer and an electric charge conveyance layer, the two-layer type being usually used in OPC. Light sensitivity of many of the photoreceptors which show the aforementioned semiconductor characteristic, is generally low in a low electric field, compared with a high electric field, and when electric potential is lowered due to an increase in the amount of light, the sensitivity is lowered. For that reason, the information concerning the surface potential in the low luminance region is important. Specifically, the surface potential on the low $\gamma$ photoreceptor which has been formed as an electrostatic latent image, is subsequently detected, and exposure is conducted according to the detected surface potential in order to control the charging potential. In the way described above, the influence can be prevented which is caused by the fluctuation of photosensitivity due to the change of environmental factors. Further, the charging potential is controlled in order to compensate the fluctuation of photosensitivity caused by the deterioration of the photoreceptor.

If an electrostatic latent image were formed on a low $\gamma$ photoreceptor by beams emitted from the aforementioned optical scanning system, then a sharp dot-shaped latent image could not be formed because the sensitivity of the aforementioned photoreceptor is generally high in the beginning of exposure, so that the fluctuation of the photoreceptor tends to be picked up.

In this case, there are problems as follows. Even when an electrostatic latent image formed by the aforementioned beams is preferably developed by the method of reversal development, the sharpness of the obtained image is low in many cases. Further, recording of high density is difficult.

In order to take measures to meet the situation described above, the inventors have developed an image forming apparatus having a high $\gamma$ type photoreceptor, the light decay characteristic of which is as follows: the light decay of the charging potential is not sensitive to a small amount of light so that the charging potential is not decayed when the photoreceptor receives a small amount of light; and when the photoreceptor receives a medium amount of light, the charging potential is sharply decayed.

With a view to solving the conventional problems described above, the first object of the present invention is to provide an image forming method characterized in that: a sharp latent image is formed without being influenced by the change of sensitivity of a photoreceptor caused by the fluctuation of environmental factors; and further the middle tone of the image can be accurately reproduced by dot exposure.

By the image forming method to attain the first object of the present invention, a latent image is formed on a high $\gamma$ photoreceptor when a modulated beam sent from an optical scanning system is illuminated on the photoreceptor and reversal-development is conducted, and the aforementioned image forming method is characterized in that: the maximum amount of light $I_0$ in the light amount distribution on the aforementioned photoreceptor, and the amount $P_{\frac{1}{2}}$ of light of the half decay exposure satisfy the following inequality;

$$1.2 \times P_{\frac{1}{2}} \leq I_0 \leq 2.5 \times P_{\frac{1}{2}}$$

Further, the present invention is characterized in that: the aforementioned modulated beam is pulse-width-modulated.

The second object of the present invention is to provide an image forming apparatus in which an image of stable quality can be formed without being influenced by the change of light sensitivity of a high $\gamma$ type photoreceptor, wherein the change of light sensitivity is caused by the fluctuation of environmental factors.

The second object of the present invention can be attained by an image forming apparatus in which a high $\gamma$ type photoreceptor is illuminated with a modulated beam sent from an optical scanning system so that a latent image is formed and reversal-development is conducted, and which comprises: a half decay exposure amount detection means which detects the half decay exposure amount $P_{\frac{1}{2}}$ by which surface potential $V_0$ of the aforementioned photoreceptor can be reduced to $\frac{1}{2}$; and a light emission amount setting means which sets the amount of light emitted by a semiconductor laser to a predetermined value according to the result of detection conducted by the aforementioned half decay exposure amount detection means.

The aforementioned light emission amount setting means is characterized in that: the amount of light emitted by the semiconductor laser is set to 1.2–2.5 times that of the half decay exposure amount $P_{\frac{1}{2}}$.

Figure 8:
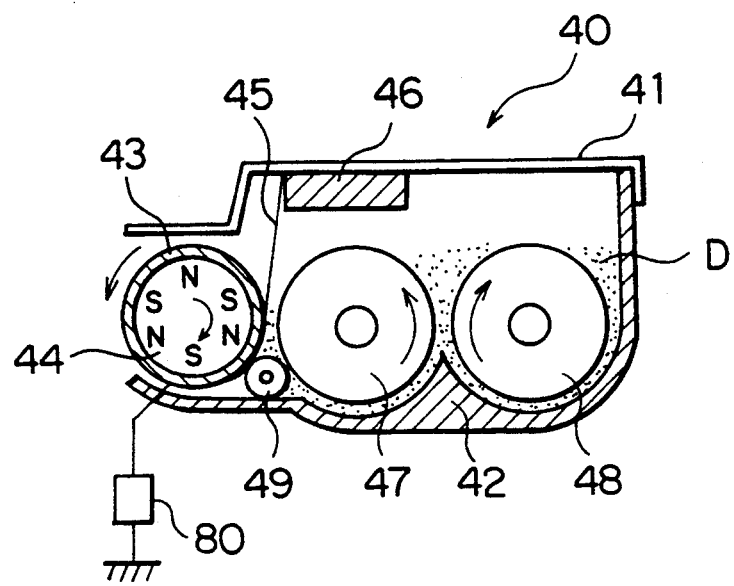
Figure 9:
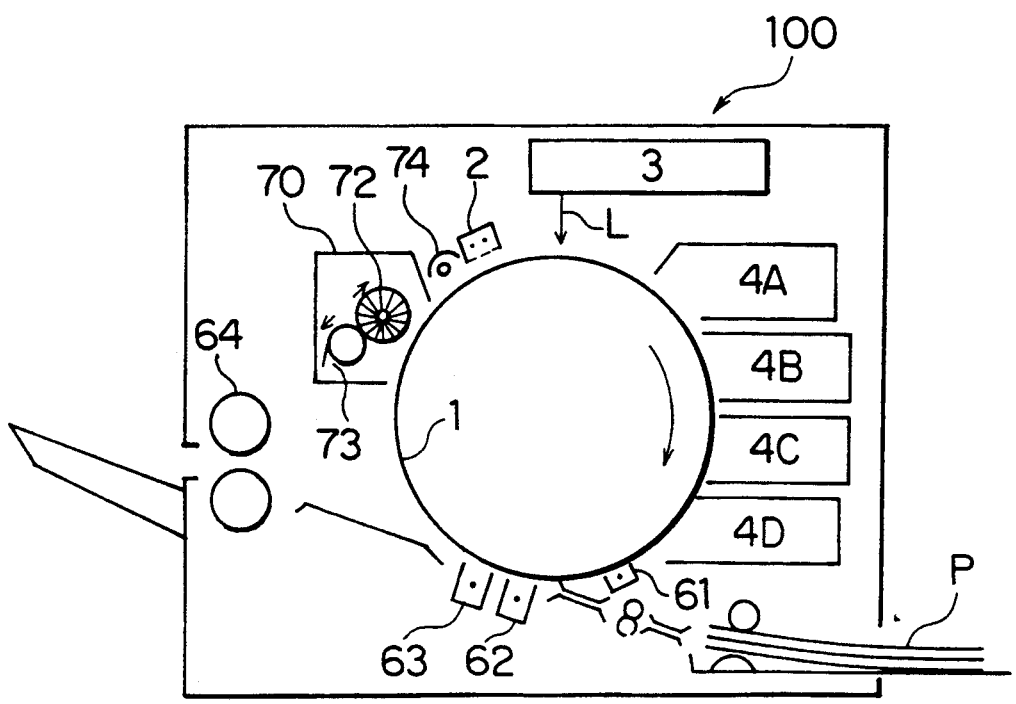
Figure 10:
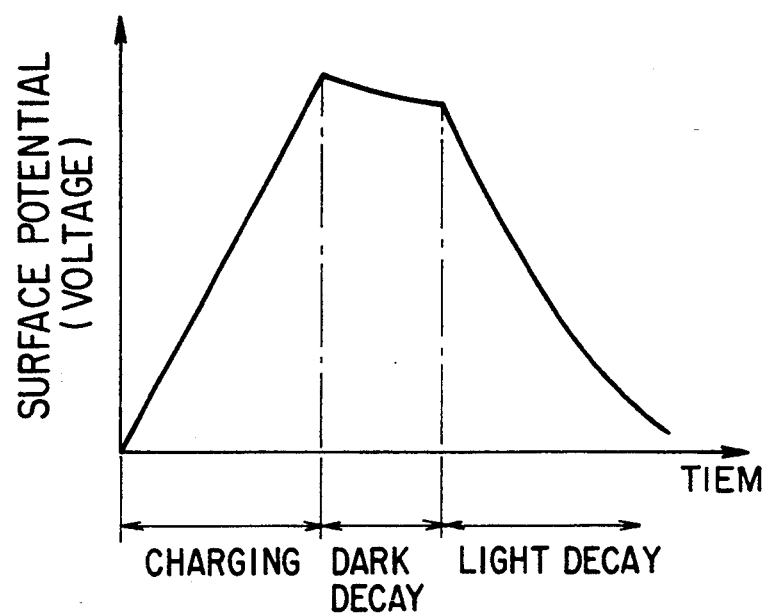
Figure 11:
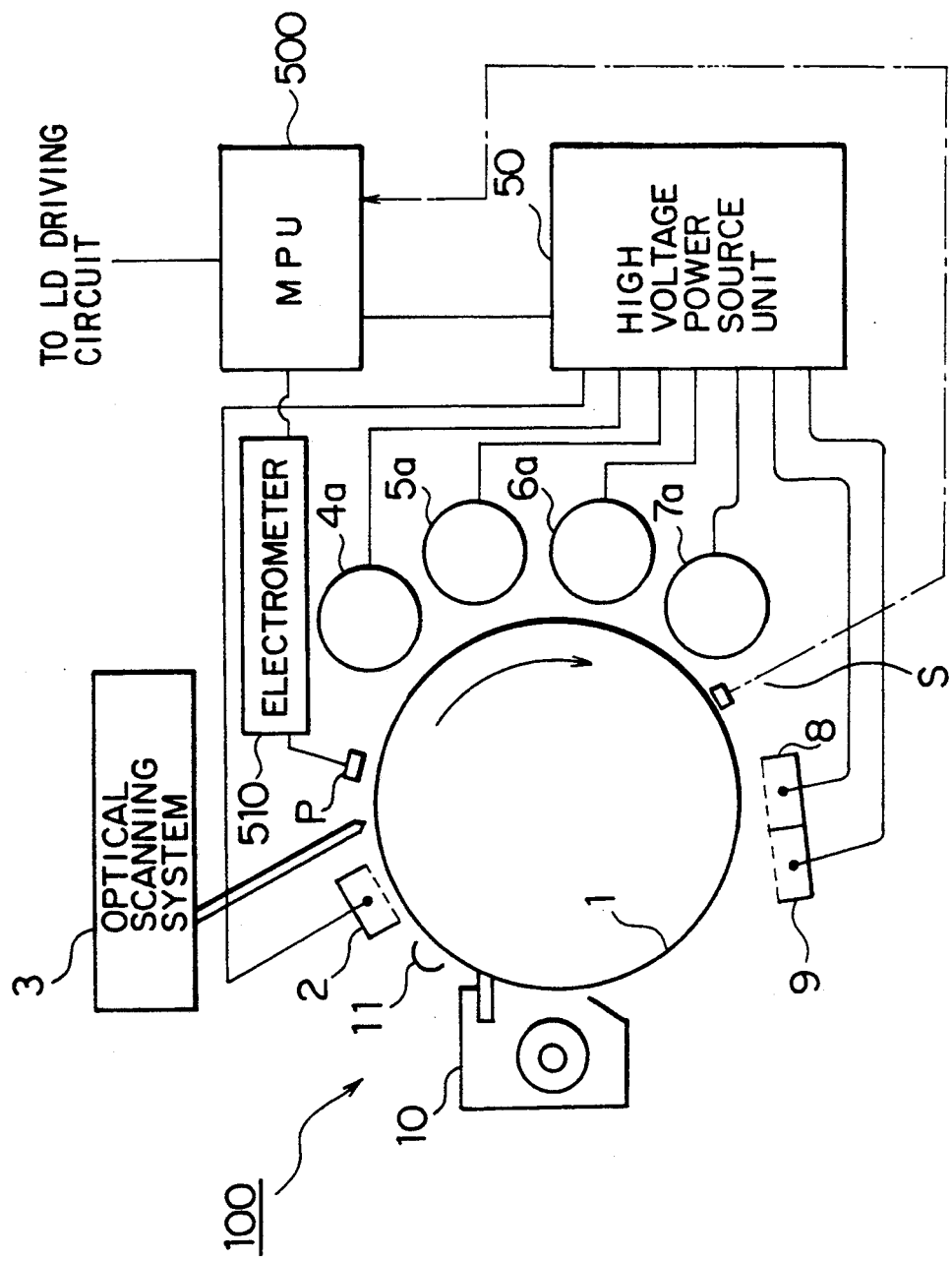
Figure 12:
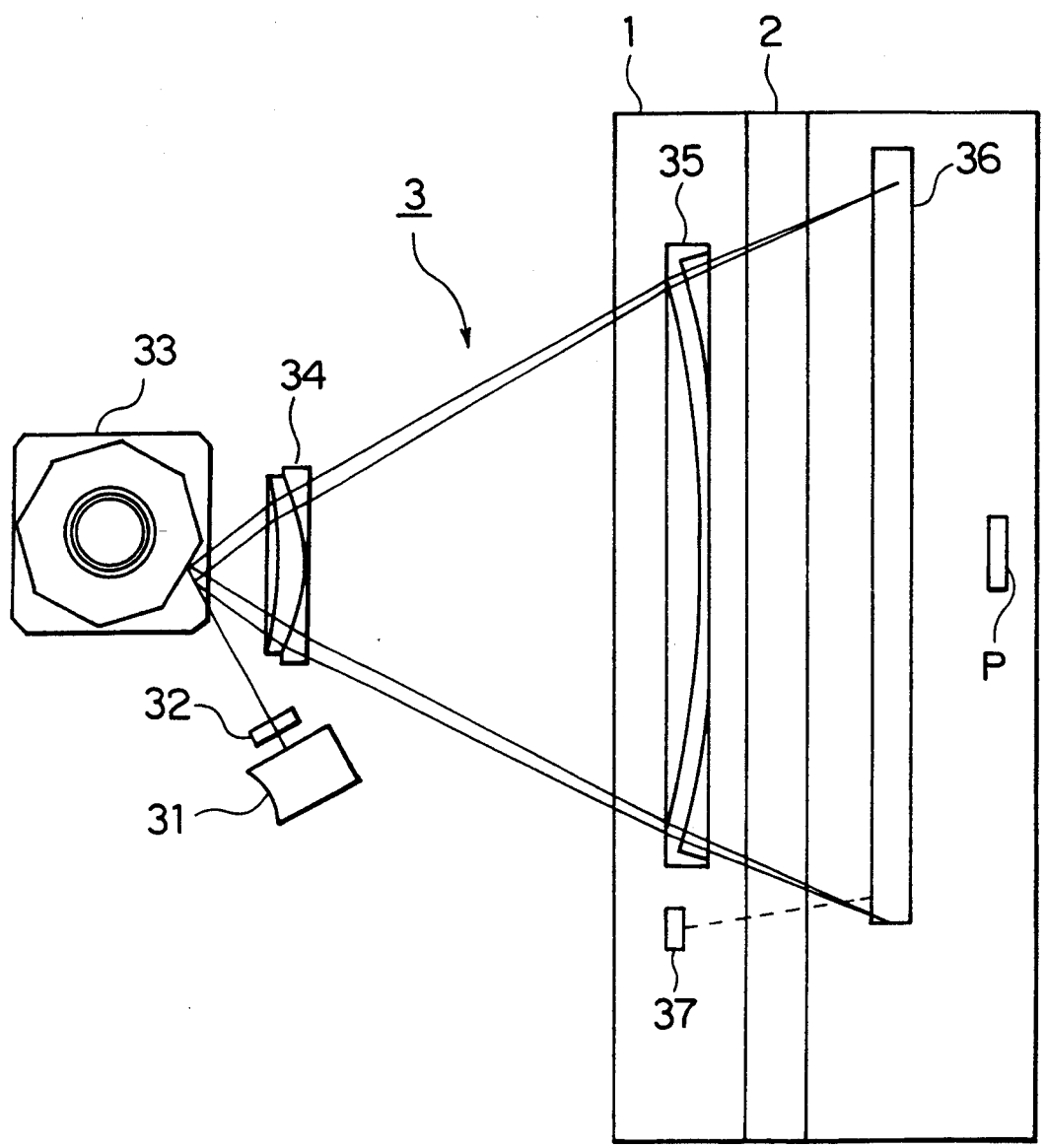
Figure 13:
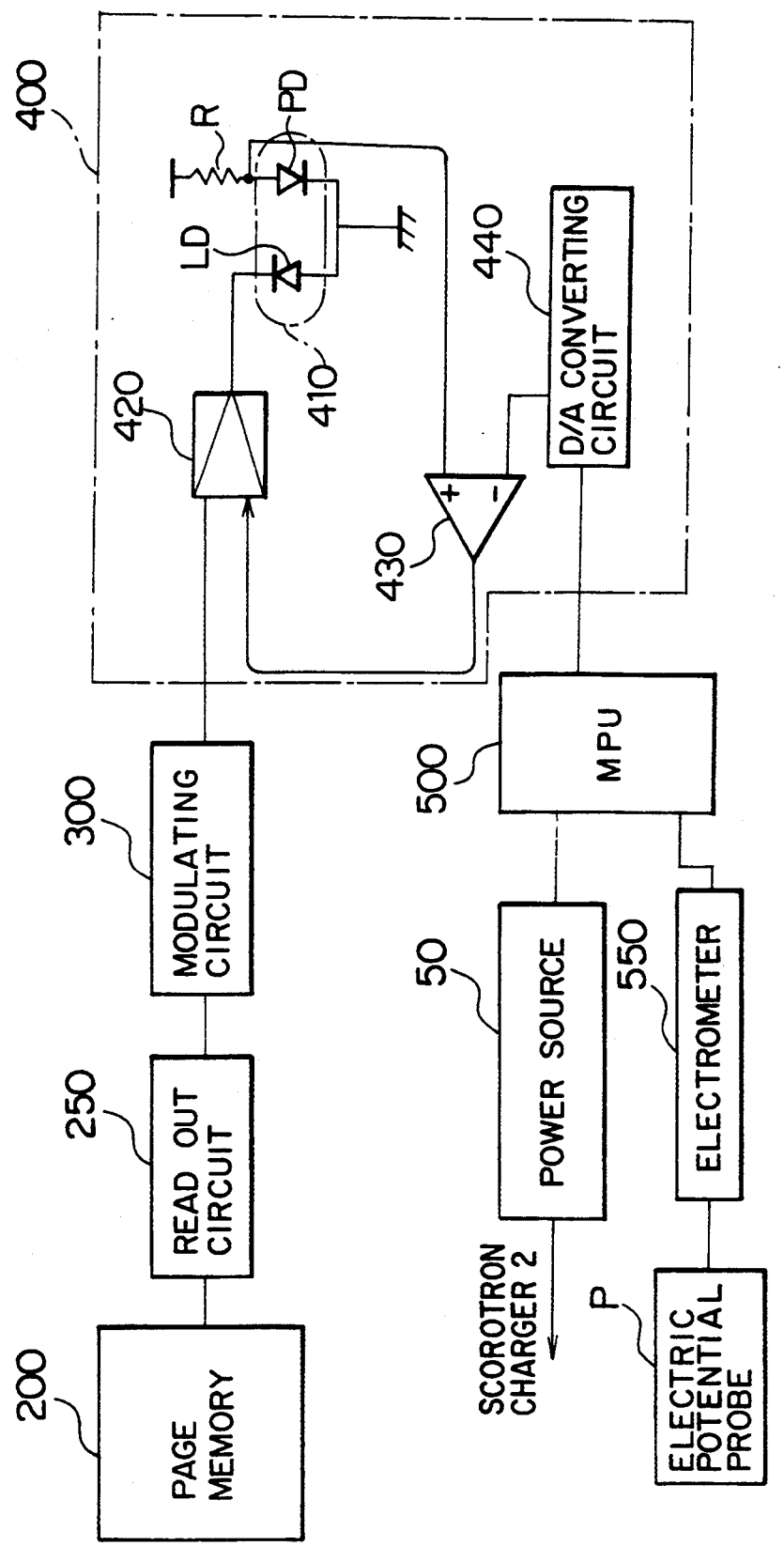
Figure 14:
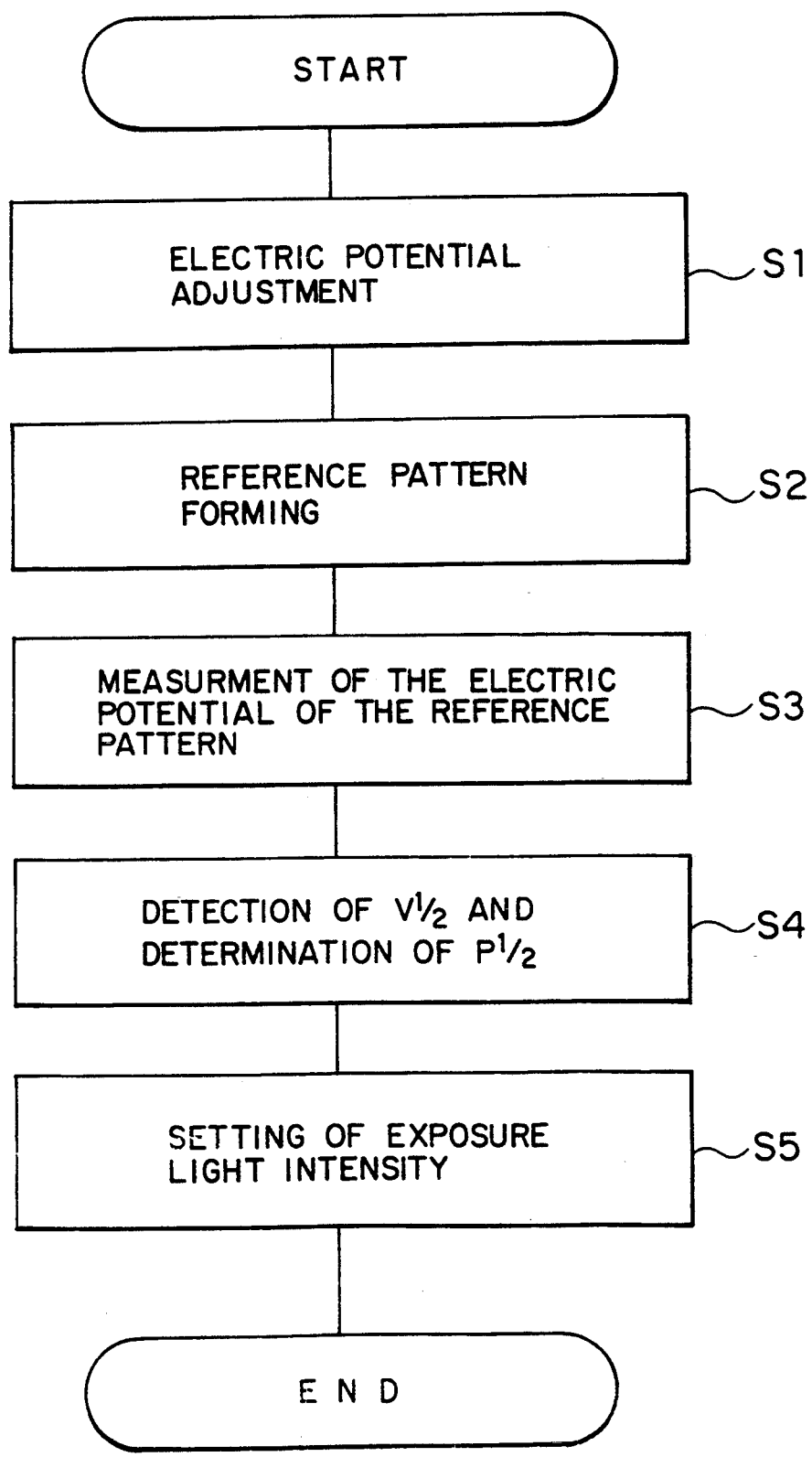

Marks (a)–(f) in FIG. 7 are time charts explaining the operation of the image forming apparatus of this embodiment according to the pulse-width-modulation signal;

FIG. 8 is a sectional view of a developing unit which is provided to the image forming apparatus of this embodiment;

FIG. 9 is a sectional view showing the outline of the structure of the image forming apparatus of this embodiment;

FIG. 10 is a schematic illustration showing the characteristic of a low $\gamma$ type photoreceptor;

FIG. 11 is a block diagram showing the outline of the structure of the image forming apparatus of an embodiment which can accomplish the second object of the present invention;

FIG. 12 is a plan view which shows the structure of the essential portion of the image forming apparatus of this embodiment;

FIG. 13 is a block diagram showing the control circuit of the optical scanning system of this embodiment;

FIG. 14 is a flow chart showing the operation of the control circuit of the optical scanning system of this embodiment; and FIG. 15(a) and (b) are graphs showing the relation between the amount of exposure of the beam sent from the optical scanning system and the electrical potential on the surface of the high $\gamma$ type photoreceptor.

DETAILED DESCRIPTION OF THE PREFERRED EMBODIMENT

Before the image forming method to accomplish the first object of the present invention is explained, the following will be explained: the outline of the light decay characteristic of a high $\gamma$ type photoreceptor; the luminance distribution of modulated beams illuminated on the upper surface of the high $\gamma$ type photoreceptor; and the relation between the latent image potential on the upper surface of the high $\gamma$ type photoreceptor and the distribution of the amount of exposure.

First, the relation between the distribution of the amount of exposure and the latent image potential on the high $\gamma$ type photoreceptor will be explained as follows.

Figure 1:
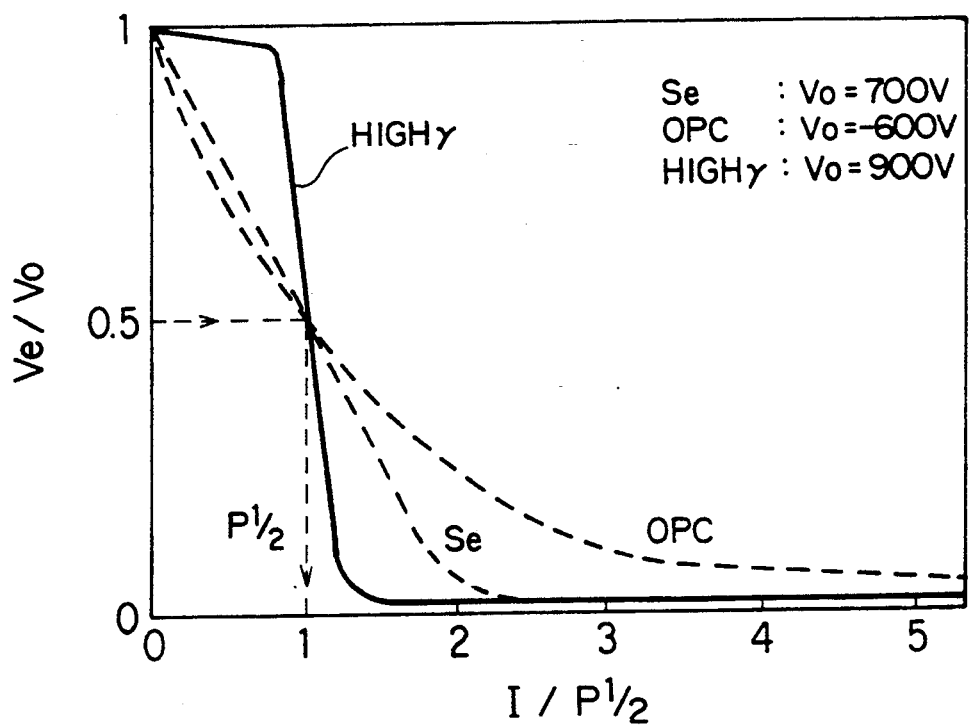
FIG. 1 is a graph showing the relation between the latent image potential of a high $\gamma$ photoreceptor and the exposure amount distribution, which explains an embodiment to accomplish the first object of the present invention.

FIG. 1 is a graph showing the relation between the latent image potential and the amount of exposure on the high $\gamma$ type photoreceptor of this embodiment. The characteristics of photoreceptors made from Se and OPC are shown in the drawing for reference.

In the drawing, the vertical axis indicates the value obtained when latent image potential V1 is divided by $V_0$ so that latent image potential V1 can be standardized, and the horizontal axis indicates the value obtained when the overall exposure amount I is divided by the half decay exposure $P_{\frac{1}{2}}$ so that the overall exposure amount I can be standardized.

The relation between the image quality and the amount of exposure was investigated, and the following results were obtained: in the case of a high $\gamma$ photoreceptor, the best image quality was obtained when I was 1.2–2.5. In the case of a Se photoreceptor, the best image quality was obtained when I was set to $3 \times P_{\frac{1}{2}} – 5 \times P_{\frac{1}{2}}$. In the case of an OPC photoreceptor, the best image quality was obtained when I was set to $4 \times P_{\frac{1}{2}} – 6 \times P_{\frac{1}{2}}$. However, the sharpness of the latent image was inferior to that formed by the high $\gamma$ type photoreceptor.

In other words, when a high $\gamma$ type photoreceptor is adopted to an image forming apparatus, it is an important factor to set the amount $I_0$ of exposure of the optical scanning system to $1.2 \times P_{\frac{1}{2}} – 2.5 \times P_{\frac{1}{2}}$, which is lower than the amount of exposure in the case of an Se or OPC photoreceptor. In the manner described above, the characteristic of the high $\gamma$ type photoreceptor can be fully utilized so as to form a latent image.

Next, the light decay characteristic of the high $\gamma$ type photoreceptor adopted to the present invention will be explained as follows.

Figure 3:
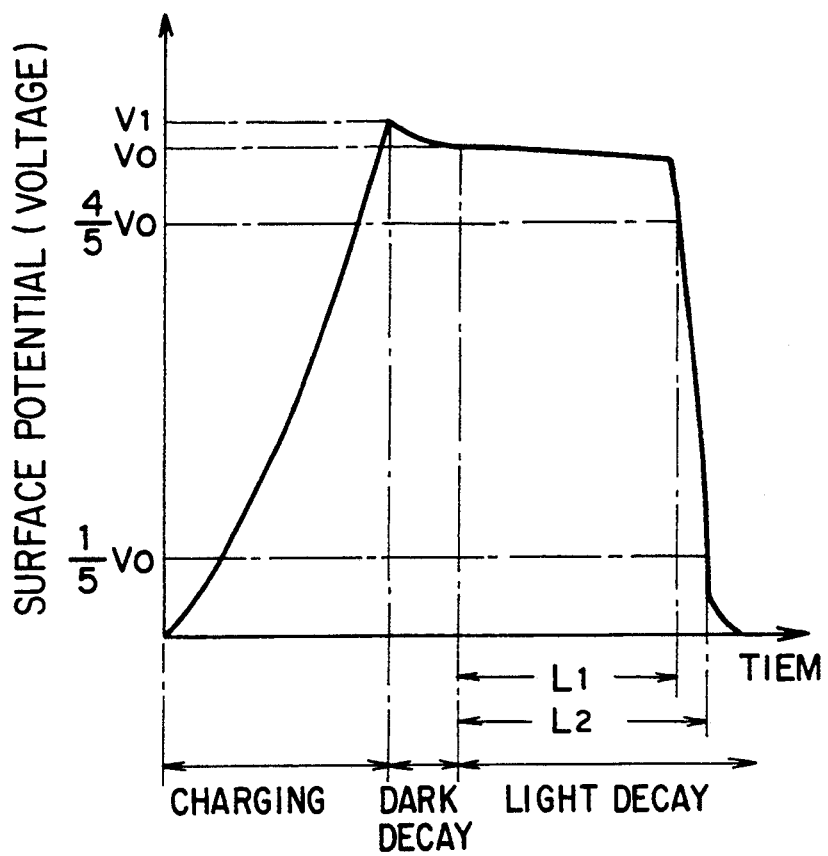
FIG. 3 is a schematic illustration showing the characteristic of the high $\gamma$ type photoreceptor.

FIG. 3 is a schematic illustration showing the characteristic of the high $\gamma$ type photoreceptor.

In the drawing, $V_1$ is charging potential, $V_0$ is initial potential before exposure, L1 is the amount ($\mu J/cm^2$) of light of the illuminated laser beam which is necessary for initial potential $V_0$ to be decayed to 4/5, and L2 is the amount ($\mu J/cm^2$) of light of the illuminated laser beam which is necessary for initial potential $V_0$ to be decayed 1/5.

The preferable range of $L_2/L_1$ is as follows.

$$1.0 \leq L_2/L_1 \leq 1.5$$

In this embodiment, $V_1 = 1000(V)$, $V_0 = 950(V)$, and $L_2/L_1 = 1.2$. The electrical potential of the exposed portion on the photoreceptor is 10 V.

When $E_{\frac{1}{2}}$ is defined as the light sensitivity in the position corresponding to the middle stage of exposure in which initial electrical potential ($V_0$) is decayed to $\frac{1}{2}$ in the light decay curve, and when $E_{9/10}$ is defined as the light sensitivity in the position corresponding to the initial stage in which initial potential ($V_0$) is decayed to 9/10, a photoconductive semiconductor satisfying the following relation is selected.

$$(E_{\frac{1}{2}})/(E_{9/10}) \geq 2$$

more preferably;

$$(E_{\frac{1}{2}})/(E_{9/10}) \geq 5$$

In this case, the light sensitivity is defined as the absolute value of electrical potential drop with regard to a minute amount of exposure.

As shown in the light decay curve of the photoreceptor 1 shown in FIG. 3, when the amount of light is small, the absolute value of the differential coefficient of the electrical potential characteristic curve is small, and when the amount of light is increased, the curve is sharply decayed. Specifically, as shown in FIG. 3, the light decay curve can be described as follows: in the initial stage of exposure, the sensitivity characteristic is so bad that the light decay curve is approximately flat; and in the middle stage of exposure, which is from $L_1$ to $L_2$, the sensitivity characteristic becomes very sensitive and the light decay curve descends almost linearly to show the ultra high $\gamma$ characteristic. It can be considered that the photoreceptor 1 obtains the high $\gamma$ characteristic having the possibility of the avalanche phenomenon under the condition that the photoreceptor 1 is charged to a high voltage of $+500 - +2000$ V. In other words, the carrier which has been generated on the surface of a photoconductive pigment, is effectively trapped on the interface between the pigment and the coating resin, so that the light decay is positively restricted. As a result, a very sharp avalanche phenomenon occurs in the middle stage of exposure.

The physical meaning of the appropriate conditions obtained in the aforementioned manner, will be studied as follows.

Figure 2:
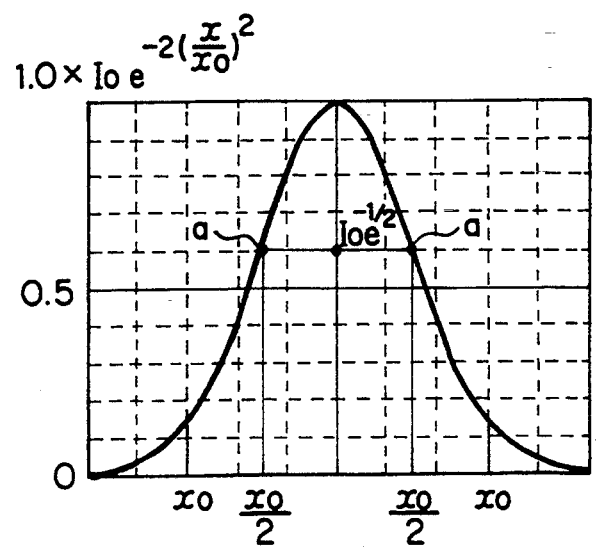
FIG. 2 is a graph showing the luminance distribution of the beam which is illuminated on the photoreceptor.

FIG. 2 is a graph showing an example of luminance distribution of the beam which is illuminated on the surface of a photoreceptor by an optical scanning system.

The beam which is illuminated on the photoreceptor 1 for image-formation, is distributed in the manner of Gaussian distribution or in a manner which is similar to Gaussian distribution. The luminance distribution of the beam is on the curve of $I = e^{-2 \times (x/x_0)^2}$. In this Gaussian distribution, $I = I_0 \times e^{-\frac{1}{2}}$ in the position where $x = \pm x_0/2$. This position is the point a at which the beam luminance distribution curve is most sharply changed.

In the image forming method of the present invention, exposure intensity $I_0 \times e^{-\frac{1}{2}}$ in the aforementioned position of $x = \pm x_0/2$ where the curve is most sharply changed, is made equal to the reduced amount of light $P_{\frac{1}{2}}$ which will be described later.

Namely, it can be considered that a predetermined region including $I_0 = e^{\frac{1}{2}} \times P_{\frac{1}{2}}$ is the appropriate condition. When the aforementioned appropriate condition is adopted, latent images can be stably formed without being influenced by the change of sensitivity of the photoreceptor. Specifically, in some cases, the beam shape does not conform to the Gaussian distribution curve or the beam shape could be rectangular in the same manner as the pulse-width-modulation. However, the curve of the rising and last transition portions can be approximated to the Gaussian distribution curve. In the manner described above, image-formation can be stably conducted without being influenced by the change of sensitivity of the photoreceptor 1 which is caused by environmental factors. The diameter of the dot formed by this exposure intensity is $\frac{1}{2}$ as compared with the case of a conventional Se or OPC photoreceptor in which the value is set to $x - x_0$. Namely, when the aforementioned exposure conditions are set, high density recording can be conducted by the same optical system.

Next, the image forming method of the present invention will be explained as follows.

The inventors' eyes were fixed upon the light decay curve of electric potential of a photoreceptor in combination with reversal-development. The characteristic of the image forming method of the present invention will be explained as follows. The image forming method of the present invention is provided with a high $\gamma$ photoreceptor having the light decay characteristic such that: the light decay of the charging potential is not sensitive with regard to a small amount of light; and in the middle stage in which the amount of light exceeds the aforementioned small amount, the charging potential is sharply decayed. After the photoreceptor has been uniformly charged, an electrostatic latent image is formed on the aforementioned photoreceptor under the condition that the maximum amount of light $I_0$ and the half decay amount of exposure $P_{\frac{1}{2}}$ satisfy the following inequality;

$$1.2 \times P_{\frac{1}{2}} \leq I_0 \leq 2.5 \times P_{\frac{1}{2}}$$

where $I_0$ is the maximum value in the distribution of the light amount of the beam, and $P_{\frac{1}{2}}$ is the amount of exposure light by which the electric potential of the aforementioned photoreceptor is decreased to $\frac{1}{2}$. After that, the latent image formed on the photoreceptor is developed by the method of reversal-development.

In the manner described above, image-formation is stably conducted without being affected by the fluctuation of environmental factors. In the case where the same optical system is utilized, the diameter of the dot formed by the aforementioned exposure intensity is approximately $\frac{1}{2}$ of the diameter of the dot formed by the conventional method in which the photoreceptor made from Se or OPC is utilized. In other words, when the aforementioned exposure conditions are set, recording of high density can be performed by the same optical system.

In other words, in the case of the aforementioned photoreceptor, the carrier which has been generated on the surface of a photoconductive pigment, is effectively trapped on the interface between the pigment and the coating resin, so that the light decay is positively restricted. As a result, a very sharp avalanche phenomenon occurs in the middle stage of exposure and an electrical potential drop occurs. In the way described above, an electrostatic latent image with high contrast, the electrical potential of a non-image portion of which is stable, can be formed, and the latent image can be stably developed by the method of reversal-development.

Further, in the present invention, the aforementioned modulated beam is made by the method of pulse width modulation, so that an electrostatic latent image with high contrast, the electrical potential of the non-image portion of which is stable, can be formed and reversaly developed stably.

Referring now to FIG. 9, the outline of the structure of the image forming apparatus 100 of this embodiment will be explained as follows.

FIG. 9 is a sectional view showing the outline of the structure of the image forming apparatus of this embodiment.

In the color image forming apparatus 100, a photoreceptor is uniformly charged, then shading correction, gradation correction and masking correction are conducted on the image density signal sent from a computer or a scanner. A dot-shaped light is obtained by pulse-width modulation in accordance with a modulation signal which has been obtained by comparing an analog image density signal obtained by D/A-converting the aforementioned digital image density signal, with a reference signal, wherein the aforementioned obtained modulation signal is binarized. Then, a dot-shaped electrostatic latent image is formed by the aforementioned dot-shaped light. The latent image is reversaly developed by toner so that a dot-shaped toner image is formed. The above-described exposure and development processes are repeatedly conducted so that color toner images can be formed on a photoreceptor 1, and the above-described color toner images are transferred, separated and fixed so that a final color image is obtained.

The image forming apparatus 100 comprises: the drum-shaped photoreceptor 1 (which will be called a photoreceptor, hereinafter), a scorotron charger 2 which gives a uniform electric charge on the aforementioned photoreceptor 1, an optical scanning system 30, developing units 4A, 4B, 4C, 4D in which toners of yellow, magenta, cyan and black are loaded, a pretransfer charger 61, a scorotron transfer unit 62, a separator 63, a fixing roller 64, a cleaning unit 70, and a discharger 74.

The structure of each portion of the image forming apparatus of this embodiment will be explained as follows.

Figure 4:
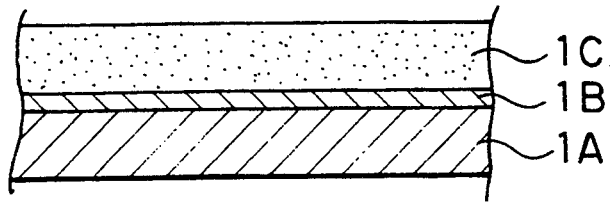
FIG. 4 is a sectional view showing the specific structure of the high $\gamma$ type photoreceptor.

FIG. 4 is a sectional view showing an example of the specific structure of a high $\gamma$ photoreceptor.

The main structure of the embodiment will be explained as follows.

As shown in FIG. 4, the photoreceptor 1 comprises a conductive support 1A, a middle layer 1B and a photosensitive layer 1C. The thickness of the photosensitive layer 1C is 5–100$\mu$, and preferably 10–100$\mu$. The photosensitive layer 1C is composed in such a manner that: the drum-like conductive support 1A made from aluminum is utilized, the diameter of which is 150 mm; the intermediate layer 1B made of ethylene-vinyl acetate copolymer, the thickness of which is 0.1 $\mu$m, is formed on the aforementioned support 1A; and the photoconductive layer 1C, the layer thickness of which is 35 $\mu$m, is formed on the aforementioned intermediate layer 1B.

A drum made of aluminum, steel, copper or the like, the diameter of which is 150 mm, is used as the conductive support 1A. The following may be used as the conductive support 1A: a belt-like support made of paper or plastic on which a metal layer is laminated or vapor-deposited; or a metallic belt such as a nickel belt made by the method of electroforming. The intermediate layer 1B is preferably provided with the following properties so that the intermediate layer 1B can withstand a high potential of ±500–±2000 V, for example, in the case of positive charging, the migration of electrons from the conductive support 1C is prevented; and the intermediate layer 1B has a hole mobility so that an excellent light decay characteristic can be obtained due to an avalanche phenomenon. Therefore, a positive charging type of electric charge conveyance material, which is described in the specification of Japanese Patent Publication Open to Inspection No. 44662/1988 proposed by the applicant, is preferably added into the intermediate layer 1B by not more than 10 weight %.

For example, the following resins, which are applied to a photosensitive layer for use in electrophotography, may be used for the intermediate layer 1B.

(1) Vinyl polymer such as polyvinyl alcohol (poval), polyvinyl methylether, and polyvinyl ethylether
(2) Nitrogen containing vinyl polymer such as polyvinyl amine, poly-N-vinyl imidazole, polyvinyl pyridine (polyvinyl pyridinium salt), polyvinyl pyrrolidone, and vinylpyrrolidonevinyl acetate copolymer
(3) Polyether polymer such as polyethylene oxide, polyethylene glycol, and polypropylene glycol
(4) Acrylic acid polymer such as polyacrylic acid and its salt, polyacrylic amide, and poly-$\beta$-hydroxyethyl acrylate
(5) Methacrylate polymer such as polymethacrylate and its salt, polymethacrylate amide, and polyhydroxypropyl methaacrylate
(6) Ether cellulose polymer such as methyl cellulose, ethyl cellulose, carboxymethyl cellulose, hydroxyethyl cellulose, and hydroxypropyl methylcellulose
(7) Polyethyleneimine polymer such as polyethyleneimine
(8) Polyamino acid such as polyalanine, polyserine, poly-L-glutamic acid, poly(hydroxyethyl)-L-glutamine, poly-$\delta$-carboxymethyl-L-cystein, polyproline, lysine-tyrosine copolymer, glutamic acid-lysine-alanine copolymer, silkfibroin, and casein
(9) Starch and its derivatives such as starchacetate, hydroxyne ethylstarch, starchacetate, hydroxyethylstarch, aminestarch, and phosphatestarch
(10) Polymer soluble in a mixed solvent of water and alcohol such as soluble nylon which is polyamide and methoxymethylnylon (8 type nylon)

The photosensitive layer 1C is formed in such a manner that: electric conveyance material is not essentially contained in the photosensitive layer 1C; phthalocyanine particulates, the diameter of which is 0.1–1 $\mu$m, as photoconductive pigment, an antioxidant, and a binder resin are mixed and dispersed, in a solvent of binder resin, so that a coating slurry can be prepared; the aforementioned coating slurry is coated on the intermediate layer; the coated intermediate layer is dried; and heat treatment is conducted, if necessary.

When both the photoconductive material and electric charge conveyance material are contained, a photoconductive material including a photoconductive pigment and an electric charge conveyance material, the weight of which is not more that 1/5, preferably 1/100–1/10 of the aforementioned photoconductive pigment, and an antioxidant are dispersed in a binder resin so that a photosensitive layer is formed.

In this embodiment, color toner images are superimposed on the photoreceptor, so that a photoreceptor, the spectral sensitivity of which is on the long wavelength side, is needed so that the beam sent from the optical scanning system can not be shielded by the color toner images.

Figure 5:
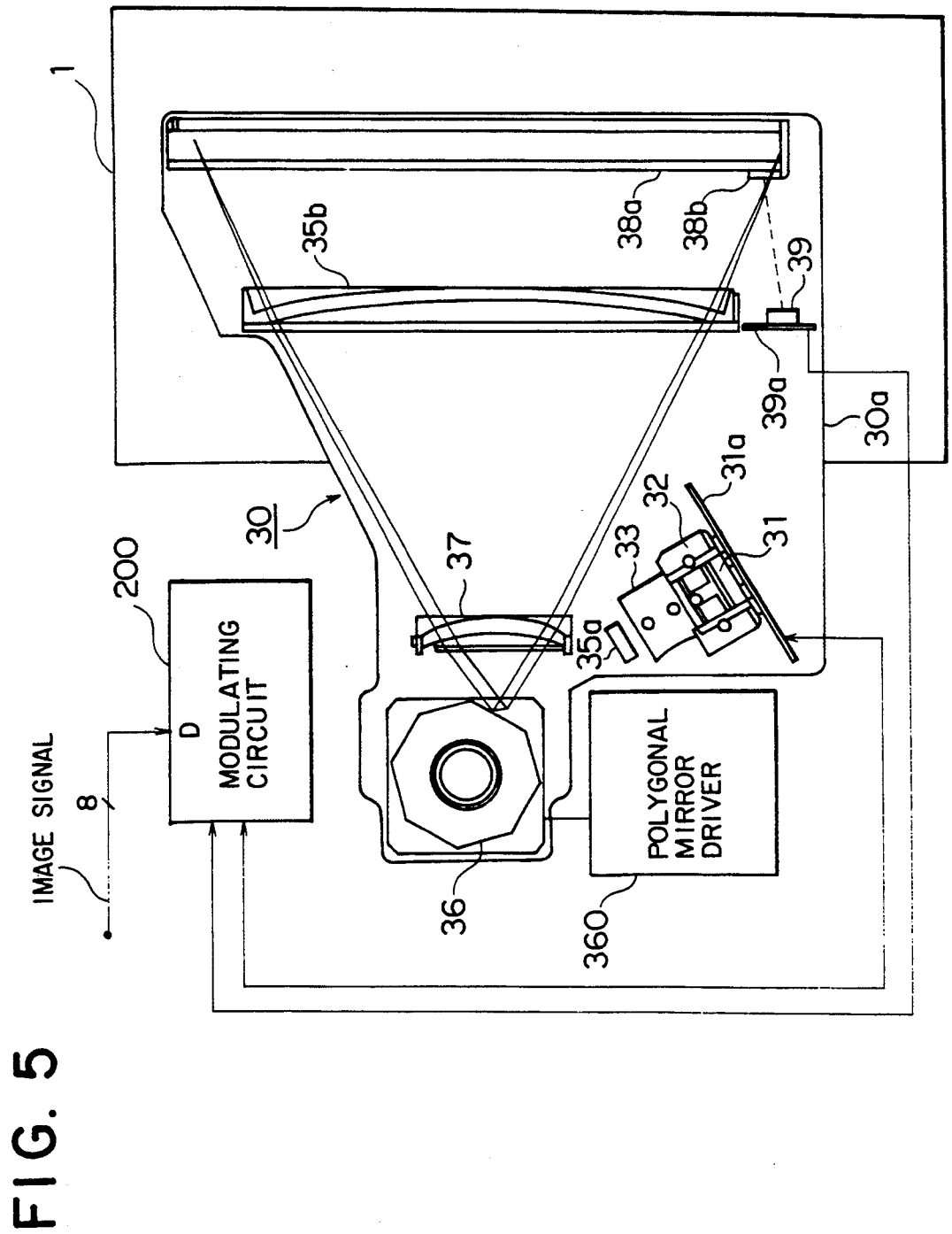
FIG. 5 is a block diagram showing the outline of the optical scanning system which is adopted in the image forming apparatus of this embodiment.
Figure 6:
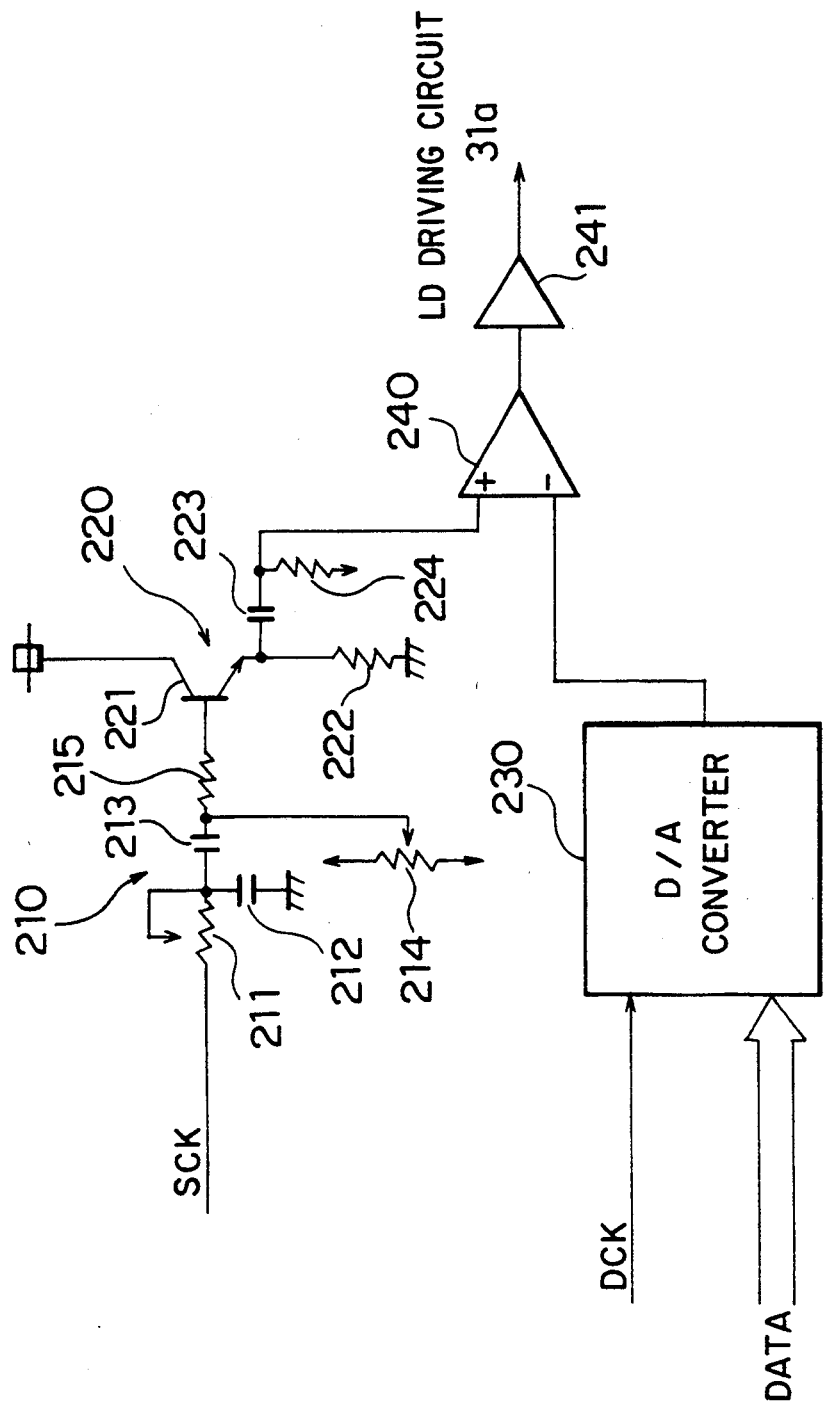
FIG. 6 is a block diagram showing the outline of the structure of the modulation circuit which is adopted in this embodiment.

FIG. 5 is a block diagram showing the outline of the structure of the optical scanning system adopted to the image forming apparatus of this embodiment, and FIG. 6 is a block diagram showing the outline of the structure of the modulation circuit adopted to this embodiment.

In the optical scanning system 30, a semiconductor laser 31 is oscillated by a modulated signal which has been obtained by pulse-modulating of an image density signal sent from a page memory (which is not shown in the drawing). The laser beam is deflected by a polygonal mirror 36 which is rotated at a predetermined speed. The deflected beam is refracted by an f$\theta$ lens 37 and cylindrical lenses 35a, 35b so that a minute dot-shaped beam can scan the surface of the photoreceptor 1 which has been uniformly charged.

The optical scanning system 30 comprises: the semiconductor laser 31 which is used as a coherent light source; a collimator lens 32 and a prism 33 which are used as an optical modulation system; the polygonal mirror 36 and the fθ lens 37 which are used as an optical deflection system; the cylindrical lenses 35a, 35b which are used as an optical tilt correction system, wherein the tilt is caused by the polygonal mirror 36; and reflection mirrors 38a, 38b.

The semiconductor laser 31 is made from GaAlAs. Its maximum output is 5 mW, its optical efficiency 25%, and its divergent angle is 8°–16° in the direction parallel with the composition surface and 20°–36° in the direction perpendicular to the composition surface. Since color toner images are superimposed on the surface of the photoreceptor 1 in sequence, it is preferable to utilize light, the wavelength of which is so long that the absorption by colored toner is small, for exposure. In this case, the wavelength of the beam is 800 nm.

The collimator lens 32 is used so as to effectively adjust the beam diameter. Its numerical aperture N.A is 0.33 and the transmission factor is not less than 97%. The collimator lens 32 is used so as to improve spherical aberration and spot size condition.

The transmission factor of the prism 33 is not less than 80%, and the diameter of the beam sent from the semiconductor laser 31 is compressed to ⅓ by the prism 33.

The optical deflection system is used so as to converge the beam (light flux) and used so as to reduce the Petzval's summation and astigmatism in order to make the scanning surface flat.

The polygonal mirror 36 is provided with 8 polygonal surfaces, and when it is rotated at a revolution speed of 16535.4 rpm, the surface of the photoreceptor 1 can be scanned by the beam. It should be understood that not only a polygonal mirror but also other units can be used for the aforementioned purpose as far as they function in the same way as the polygonal mirror.

The fθ lens 37 decreases the Petzval's summation and astigmatism so as to eliminate the curvature of field. In the manner described above, the scanning surface is made flat.

As an optical correction system, the cylindrical lenses 35a, 35b are provided before and after the polygonal mirror 36 in order to decrease the unevenness of scanning lines which is caused by the tilt of the polygonal mirror 36. In this way, the tilt angle of the polygonal mirror becomes 120 sec P—P, and the correction coefficient of tilt angle becomes not less than 1/20. The cylindrical lens 35b is used to form an image on the surface of the photoreceptor 1 by the beam. The spread of the dot-shaped beam is 20.5±5 μm in the primary scanning direction, and 82.5±12.5 μm in the subsidiary scanning direction. On the other hand, it was possible to set the recording density of both primary and subsidiary scanning to 800 dpi. Pulse-width-modulation is utilized in the primary scanning. Namely, according to the present invention, it has become possible to conduct a recording of high density by setting an appropriate exposure on a high γ photoreceptor.

Further, a modulation circuit 200 is provided in the control circuit of the optical scanning system 30. An index sensor 39 and an index detection circuit 39a are provided as a synchronizing system. A polygonal driver 360 is provided as a deflection system.

The beam sent from the optical deflection system is incident upon the index sensor 39 through a reflection mirror 38b by the action of the synchronizing system. The index sensor 39 is induced by the beam and outputs an electric current. The current is current/voltage A/V-converted by the index detection circuit 39a and outputted as an index signal. The surface position of the polygonal mirror 36 which is rotated at a predetermined speed, is detected by this index signal, and optical scanning is conducted by a modulated digital image density signal, which will be described later, according to the raster scanning system, wherein the period of the scanning is that of the primary scanning direction. The scanning frequency is 2204.72 Hz, the effective printing width is not less than 297 mm, and the effective exposure width is not less than 306 mm.

A modulation circuit 200 is provided for the purpose of outputting a pulse-width-modulation signal which has been binarized after comparing a reference wave with an analog density signal which has been obtained by D/A-converting a digital image density signal of a predetermined bit, for example, 8 bits. As shown in FIG. 6, the modulation circuit 200 comprises a reference wave signal generating circuit 210, a buffer circuit 220, a comparator 240, and a D/A-converter 230. The modulation signal outputted from the modulation circuit 200 is utilized as a drive signal of an LD drive circuit 31a.

In a reference wave signal generating circuit 210, triangular waves are generated by an integrator composed of a variable resistor 211 and a condenser 212. The aforementioned triangular wave is inputted into a base terminal of a transistor 221 through a condenser 213 and a protective resistor 215. The reference wave signal generating circuit 210 is provided with two variable resistors. In other words, the variable resistor 211 is provided for adjusting the amplitude of the triangular wave. A variable resistor 214 is provided for adjusting the bias or the offset of the triangular wave. The triangular wave is inputted into a positive input terminal of the comparator 240 through the buffer circuit 220. In the comparator 240, a comparison is made between the reference wave which has passed through the buffer circuit 220 as described above and the analog density signal obtained by D/A-converting of the digital image density signal of a predetermined bit, for example, of 8 bits, using the D/A-converter 230. Then, the compared signal is binarized. After that, the signal is outputted from the output signal of the comparator 240 through an amplifier 241 in the form of a pulse-width-modulation signal synchronized with an image clock DCK. The exposure intensity is made variable by this amplifier 241.

A semiconductor laser 31 is oscillated by an LD drive circuit 31a according to a modulation signal sent from the modulation circuit 200. The LD drive circuit 31a drives in such a manner that: a signal corresponding to the light amount of the beam sent from the semiconductor laser 31 is fed back so that the amount of light can become constant.

FIG. 8 is a sectional view showing the developing unit which is applied to the image forming apparatus of the embodiment.

Developing units 4A, 4B, 4C, 4D have the same structure as illustrated in FIG. 9, wherein the colors of developers loaded in the developing units are different, so that the structure of the developing unit 40 will be explained as follows since it is typical.

The developing device 40 is provided with: a sleeve 43 including a magnetic roller 44 having N and S poles which is rotated inside a developing tank made of a lower casing 42 and an upper casing 41; a scraper 45 made of an elastic plate, which is mounted on a stationary member 46 fixed to an upper casing 41, and which comes into contact with a sleeve 43 with pressure; the first and second screw-shaped stirring members 47, 48; and a sleeve cleaning roller 49. The first stirring member 47 conveys the developer toward the viewer's side, and the second stirring member 48 conveys the developer to the far side with regard to the viewer. A wall 42 is installed between the stirring members 47, 48 so that the developer can not be accumulated in the tank. Instead of the scraper 45, a thin layer forming means composed of a magnetic plate or a magnetic rod may be installed.

The sleeve cleaning roller 49 is rotated in the direction of an arrow so that the developer which has passed through the developing region and in which the toner component has been consumed, can be scraped off from the sleeve 43. Therefore, the developer conveyed into the developing region can be replaced with a new one, so that the developing conditions are stabilized.

In order to prevent the occurrence of fogging, the sleeve 43 is connected with a development bias circuit 80 which impresses a voltage having a DC current bias component, through a protective resistance (not illustrated in the drawing).

In the case described above, a two-component type of developer D is used which is characterized in that: the particle size of the toner is 1–20 $\mu$m; and silica particulates processed by amine compounds or silica particulates to which other additives are added, are used as the electric charge controlling agent. Small sized carrier particles are advantageous from the viewpoint of resolving power and gradation reproducibility. For example, when a small carrier, the particle size of which is 5–50 $\mu$m, is used, a uniform height of magnetic brush can be formed.

The development bias circuit 80 is provided with: an AC current power source which supplies an AC bias in order to oscillate the toner between the sleeve 43 and the photoreceptor 1 in the developing region in which the toner conveyed by the sleeve is electrostatically transferred onto the photoreceptor 1; and a high voltage DC current power source which supplies a DC current bias. In this example, $V_{DC}=800$ V, $V_{AC}=700$ V, and the frequency is 3 KHz. As described above, the development bias circuit 80 generates an oscillating electric field between the sleeve 43 and the photoreceptor 1, so that the particles of the developer are oscillated in the space between the sleeve 43 and the photoreceptor 1. Accordingly, a toner image can be formed on the photoreceptor 1 under the condition that developer D does not come into contact with the photoreceptor, so that the toner image formed previously is not damaged.

In the case of non-contact development, the developer does not come into contact with the latent image, so that it is difficult to develop a fine latent image. However, when a sharp latent image is formed by a high $\gamma$ type photoreceptor, a fine portion of the latent image can be developed accurately.

For that reason, the embodiment in which the high $\gamma$ type photoreceptor is utilized is effective not only in the case of contact development but also in the case of non-contact development.

Referring to FIG. 7(a)–(f), the image forming process in the image forming apparatus 100 of the embodiment will be explained as follows.

FIG. 7(a)–(f) are time charts which explain the operation of the image forming apparatus of this embodiment, wherein the image-formation is conducted according to the pulse-width-modulation.

In the drawing, (a) shows a clock DCK. In the drawing, (b) shows an analog density signal obtained by D/A-conversion after color or gradation correction. The signal shown by a dotted line in (c) is an analog density signal indicating the density of an image which has been D/A-converted. The signal shown by a solid line is a reference wave signal. In the drawing (d) shows a pulse-width-modulated signal sent from the modulation circuit 200. The density signal corresponding to a recording pixel is synchronized with the reference signal, and a pulse-width-modulation signal corresponding to the image density is generated. In the drawing, (e) shows an exposure dot distribution on the photoreceptor 1. Namely, the exposure dot distribution is originally rectangular. However, in this case, the exposure dot distribution is spread due to MTF of the optical system. In this exposure dot distribution, the position of the amount $P_{\frac{1}{2}}$ of half decay exposure is indicated by a broken line, and the portion above the broken line is formed as a latent image due to the characteristic of a high $\gamma$ type of photoreceptor. In the drawing, (f) shows that a latent image is obtained which is composed of large and small dots corresponding to the density signal. This shows a sharp dot-shaped toner image in which no blur has occurred. When the diameter of the dot-shaped toner image is changed, a toner image, the gradation property of which has been improved, can be obtained.

The image forming process by the image forming apparatus 100 will be explained as follows.

First, the photoreceptor 1 is uniformly charged by a scorotron charger 2, and an electrostatic latent image corresponding to yellow is formed when the photoreceptor 1 is illuminated with a laser beam which has been modulated by yellow data (digital density data). The aforementioned electrostatic latent image corresponding to yellow, is developed by the first developing unit 4A, and the first dot-shaped toner image (yellow toner image) which is very sharp, is formed on the photoreceptor 1. This first toner image is not transferred onto recording paper P, and the photoreceptor 1 is charged again by the scorotron charger 2.

Next, the laser beams are optically modulated by magenta data (digital density data), and the photoreceptor 1 is illuminated by the modulated laser beams so that an electrostatic latent image can be formed. This electrostatic latent image is developed by the second developing unit 4b and the second toner image (a magenta toner image) is formed. In the same manner described before, discharging, charging and illumination of laser beams are conducted, then the toner images are developed by the third developing unit 4C in order that the third toner image (a cyan toner image) is formed. In this way, a three-color toner image in which toner images are superimposed, is formed on the photoreceptor 1. Finally, the fourth toner image (a black toner image) is formed so that a four-color toner images are formed on the photoreceptor 1.

According to the image forming apparatus 100 of the present invention, the photoreceptor has an excellent high γ characteristic. Due to the high γ characteristic, a latent image can be stably formed when the processes of charging and exposure are repeated a plurality of times so that toner images can be superimposed. In other words, even when a toner image is illuminated by a laser beam according to a digital signal, a sharp dot-shaped electrostatic latent image in which a fringe is eliminated, can be formed. As a result, a highly sharp toner image can be obtained.

After the photoreceptor 1 has been charged by the charger 61 (this process may be omitted), this four-color toner images are transferred by a transfer unit 62 onto recording paper P.

Recording paper P which conveys transferred toner images, is separated from the photoreceptor 1 by a separation electric pole 63, conveyed by a guide and a conveyance belt into a fixing unit 64, fixed by the method of heat fixing, and delivered onto a delivery tray.

The photoreceptor 1 which has finished transferring the toner image is prepared for the next multi-color image forming in such a manner that: the residual toner on the surface is removed by a blade, a fur brush or a magnetic brush of a cleaning unit 70 which has been released during toner image forming; and the photoreceptor is discharged by a discharger 74 composed of a corona discharger or a lamp. The lamp and the corona discharger 74 may be provided upstream of the cleaning means.

In the aforementioned apparatus, the appropriate conditions were investigated in such a manner that: the maximum amount $I_0$ of light in the laser beam optical distribution was changed with regard to the amount $P_{\frac{1}{2}}$ of half decay exposure.

By the image forming method of this embodiment, a latent image is formed on a high γ photoreceptor 1 when a modulated beam sent from an optical scanning system 30 is illuminated on the photoreceptor 1 and reversal-development is conducted, and the aforementioned image forming method is characterized in that: the maximum amount of light $I_0$ in the beam distribution on the aforementioned photoreceptor 1, and the amount $P_{\frac{1}{2}}$ of light of the half decay exposure satisfy the following inequality.

$$1.2 \times P_{\frac{1}{2}} \leq I_0 \leq 2.5 \times P_{\frac{1}{2}}$$

In the manner described above, the reproduction of half tone can be accurately performed by dot-exposure.

When the aforementioned modulated beam is made by the method of pulse-width-modulation in the image forming method of this embodiment, an electrostatic latent image of high contrast, the electric potential of the non-image portion of which is stable, can be formed and it can be stably reversal-developed. In the manner described above, the reproduction of half tone can be accurately performed by dot-exposure.

Other exposure means such as an LED or a liquid crystal shutter can be also applied to the present invention. In the aforementioned cases, the shape of a dot intensity distribution is similar to that of the Gaussian distribution, so that it is preferable to set the value of $P_{\frac{1}{2}}$ in the region where exposure intensity is sharply decreased. In other words, the exposure condition which is the same as that of the present invention is preferable to the high γ photoreceptor.

According to the present invention, a latent image is formed on a high γ photoreceptor when a modulated

| $I_0/P_{\frac{1}{2}}$ | 0.4 | 0.6 | 0.8 | 1.0 | 1.2 | 1.4 | 1.6 | 1.8 | 2.0 | 2.2 | 2.4 | 2.6 | 2.8 | 3.0 |
|---|---|---|---|---|---|---|---|---|---|---|---|---|---|---|
| Monocolor Image | x | x | x | x | ○ | ○ | ○ | ○ | ○ | ○ | ○ | Δ | Δ | Δ |
| MultiColor Image | x | x | x | x | x | ○ | ○ | ○ | ○ | ○ | ○ | Δ | Δ | Δ |

Mark ○ shows that the image quality is good, mark Δ shows that the image quality is a little inferior, and mark X shows that the image quality is bad.

In the above table, Mono-color image indicates the case in which mono-color images were formed by the aforementioned color image forming apparatus.

Multicolor image indicates the case in which color images were formed by the aforementioned color image apparatus.

In the case of mono-color images, the appropriate condition was as follows.

$$1.2 \times P_{\frac{1}{2}} \leq I_0 \leq 2.5 \times P_{\frac{1}{2}}$$

In the case of multicolor images, the appropriate condition was as follows.

$$1.4 \times P_{\frac{1}{2}} \leq I_0 \leq 2.5 \times P_{\frac{1}{2}}$$

In this embodiment, color image was formed in such a manner that image exposure was conducted on the toner image which had already been formed on the photoreceptor. Therefore, when the amount of exposure light was small, the light was intercepted by the toner on the surface of the photoreceptor, so that the latent image was not formed completely, which can be considered to be the reason why the condition had been changed.

beam sent from an optical scanning system is illuminated on the photoreceptor and reversal-development is conducted, and the aforementioned image forming method is characterized in that: the maximum amount of light $I_0$ in the beam distribution on the aforementioned photoreceptor, and the amount $P_{\frac{1}{2}}$ of light of the half decay exposure satisfy the following inequality.

$$1.2 \times P_{\frac{1}{2}} \leq I_0 \leq 2.5 \times P_{\frac{1}{2}}$$

Accordingly, it is possible to provide an image forming method by which the reproduction of half tone can be accurately performed without being affected by the fluctuation of sensitivity of the photoreceptor caused by environmental factors.

When the aforementioned modulated beam is made by the method of pulse-width-modulation in the image forming method of the present invention, an electrostatic latent image of high contrast, the electric potential of the non-image portion of which is stable, can be formed and it can be stably reversaly developed. In the manner described above, the image forming method can be provided in which the reproduction of half tone can be accurately performed by dot-exposure.

Referring now to FIG. 11 and FIG. 12, the outline of structure of an image forming apparatus 100 to accomplish the second object of the present invention will be explained as follows.

FIG. 11 is a block diagram showing the outline of structure of the image forming apparatus of this embodiment.

By the color image forming apparatus 100, a color image can be obtained in the following manner. After a high γ photoreceptor 1 is uniformly charged, a dot-shaped electrostatic latent image is formed by a dot-shaped light which has been pulse-modulated or intensity-modulated according to a modulation signal obtained by modulating a digital image density signal sent from a page memory. The formed latent image is reversaly developed so that a dot-shaped toner image is formed. The aforementioned exposure and developing processes are repeated so that color toner images can be formed on the surface of the photoreceptor 1, and the color toner images is transferred, separated and fixed so that a final color image is obtained.

The image forming apparatus 100 comprises: the drum-shaped photoreceptor 1 which is rotated in the direction of an arrow; a scorotron charger 2 which gives a uniform electric charge on the photoreceptor 1; an optical scanning system 3; developing units 4–7 in which toners of yellow, magenta, cyan and black are loaded; a scorotron transfer unit 8; a separator 9; a cleaning unit 10; and a discharger 11. Electric power is supplied by a high voltage power unit 50 to the developing units 4–6, the scorotron charger 2, the scorotron separator 8, and the separator 9.

The image forming apparatus 100 of this embodiment is provided with: a half decay exposure light amount detecting means to detect half decay exposure light amount $P_{\frac{1}{2}}$ by which surface potential $V_0$ of the high γ photoreceptor 1 can be reduced to ½; and a light emitting amount setting means which sets the amount of light emitted by semiconductor laser LD to a predetermined value according to the detection result sent from the aforementioned half decay exposure light amount detecting means.

The half decay exposure light amount detecting means is composed of electric potential probe P, an electrometer 510, and a microprocessor 500 (which will be called MPU, hereinafter). As shown in FIG. 11 and FIG. 12, electric potential probe P is placed in the position close to the surface of the photoreceptor 1 between the scorotron charger 2 and the developing unit 4. After the surface of the photoreceptor has been illuminated according to the reference pattern data, the surface potential on the high γ photoreceptor 1 is detected by electric potential probe P. In this embodiment, electric potential probe P is provided for the purpose of detecting $\frac{1}{2} \times V_0$ of the high γ photoreceptor. The detail of electric potential probe P will be described later. Electric potential probe P is connected with the electrometer 510, and the detection signal of the aforementioned electric potential probe P is inputted into the electrometer 510 and a digital electric potential signal indicating the voltage is outputted from the electrometer 510 into MPU 500. The light emitting amount setting means is composed of MPU 500 and a variable DC power source 440. The detail will be described later.

MPU 500 detects the surface potential of the high γ photoreceptor 1 and controls the output voltage of the high voltage power unit 50 so that the surface potential of the photoreceptor 1 can be a predetermined value.

FIG. 12 is a plan view showing the structure of the essential portion of the image forming apparatus of this embodiment.

The optical scanning system 3 is operated as follows: semiconductor laser LD is oscillated according to the modulation signal obtained by pulse-width-modulating or intensity-modulating the image density data which has been read out from the page memory 200 (which is shown in FIG. 13); the obtained laser beam is deflected by a polygonal mirror 33 which is rotated at a predetermined speed; and scanning is conducted through an fθ lens 34 and cylindrical lenses 32, 35 on the surface of the photoreceptor 1 which has been uniformly charged. Electric potential probe P is placed approximately in the middle portion on the photoreceptor 1 corresponding to the image forming region.

The optical scanning system 3 comprises: the semiconductor laser LD which is used as a coherent light source; a collimator lens 31 which is used as an optical focusing system; the polygonal mirror 33 and the fθ lens 35 which are used as an optical deflection system; the cylindrical lenses 32, 35 which are used as an optical tilt correction system, wherein the tilt is caused by the polygonal mirror 33; and a reflection mirror 36.

The semiconductor laser LD is made from GaAlAs. Its maximum output is 5 mW, its optical efficiency 25%, and its divergent angle is 8°–16° in the direction in parallel with the composition surface and 20°–36° in the direction perpendicular to the composition surface. Since color toner images are superimposed on the surface of the photoreceptor 1 in sequence, it is preferable to utilize the light, the wavelength of which is so long that the absorption by colored toner is small, for exposure. In this case, the wavelength of the beam is 800 nm.

The collimator lens 31 is used so as to effectively adjust the beam diameter. Its numerical aperture N.A is 0.33 and the transmission factor is not less than 97%. The collimator lens 32 is used so as to improve spherical aberration and spot size condition.

The optical deflection system is used so as to converge the beam (light flux) and used so as to reduce the Petzval's summation and astigmatism in order to make the scanning surface flat.

The polygonal mirror 33 is provided with 8 polygonal surfaces, and when it is rotated at a revolution speed of 16535.4 rpm, the surface of the photoreceptor 1 can be scanned by the beam. It should be understood that not only a polygonal mirror but also other units can be used for the aforementioned purpose as far as they function in the same way as the polygonal mirror.

The fθ lens 34 decreases the Petzval's summation and astigmatism so as to eliminate the curvature of field. In the manner described above, the scanning surface is made flat.

As an optical correction system, the cylindrical lenses 32, 35 are provided before and after the polygonal mirror 33 in order to decrease the unevenness of scanning lines which is caused by the tilt of the polygonal mirror 33. In this way, the tilt angle of the polygonal mirror becomes 120 sec P—P, and the correction coefficient of tilt angle becomes not less than 1/20. The cylindrical lens 35 is used to form an image on the surface of the photoreceptor 1 by the beam. The spread of the dot-shaped beam is 20.5±5 μm in the primary scanning direction and 82.5±12.5 μm in the subsidiary scanning direction at the maximum exposure intensity of 1/1². On the other hand, it was possible to set the recording density of both primary and subsidiary scanning to 800 dpi. Pulse-width-modulation is utilized in the primary scanning. Namely, according to the present invention, it has become possible to conduct a recording of high density by setting an appropriate exposure on a high γ photoreceptor.

FIG. 13 is a block diagram showing the control circuit of the optical scanning circuit of this embodiment.

The control circuit of the optical scanning system 30 is used for forming a dot-shaped electrostatic latent image by a dot-shaped light which has been obtained as follows: a comparison is made between the reference wave signal and the analog image density signal obtained by D/A-converting the digital image density signal sent from the page memory 200, and the signal is binarized or differentially amplified so that a modulated signal is obtained; and pulse-width-modulation or intensity-modulation is conducted in accordance with the obtained modulated signal so that a modulated dot-shaped light can be obtained. The optical scanning system 30 is provided with the aforementioned half decay exposure light amount detecting means and light emitting amount setting means, so that the electric current which flows in semiconductor laser LD is changed in accordance with the fluctuation of light sensitivity of the photoreceptor 1, and the amount of emitted light is always controlled in the range of 1.2 to 3.0 times of half decay exposure light amount $P_{\frac{1}{2}}$.

The control circuit of the optical scanning system comprises: electric potential probe P and an electrometer 550 which compose the half decay exposure light amount detecting means; an MPU 500 which composes the light emitting amount setting means; a page memory 200; a reading-out circuit 250; a modulation circuit 300; an LD drive circuit 400; an MPU 500; a high voltage electric power unit 50; an index sensor 37; an index detection circuit (not illustrated in the drawing); and a polygonal driver (not illustrated in the drawing) which is used as the deflection system.

The beam sent from the optical deflection system is incident upon the index sensor 37 through a reflection mirror 36. The index sensor 37 is induced by the beam and outputs an electric current. The aforementioned electric current is Current/Voltage-converted (A/V-converted) by the index detection circuit and the obtained signal is outputted as an index signal. The surface position of the polygonal mirror 36, which is rotated at a predetermined speed, is detected by this index signal, and optical scanning is conducted by the raster scanning system in accordance with the modulated digital image density signal which will be described later, wherein the period of scanning is the same as that of primary scanning. The scanning frequency is 2204.72 Hz, the effective printing width is not less than 297 mm, and the effective exposure width is not less than 306 mm.

The page memory 200 stores the digital image density signal (which is called the image density data) by the unit of one page, which has been obtained by correcting the image density signal sent from the computer or the scanner by the method of shading-correction and gradation correction. In this case, the unit of one page is defined as the amount of data corresponding to one image formed on the surface of the high γ photoreceptor 1. In the case of this embodiment, the reference pattern data, the amount of which is one scanning line of data or several scanning lines of data, is attached to the head of the one page of data, wherein the reference pattern data is defined as the image density data by which light is continuously emitted from the semiconductor laser LD.

The reading-out circuit 250 reads out the image density data by the unit of one scanning line according to the aforementioned index signal, wherein the reading-out operation is synchronized with the pixel clock.

The modulation circuit 300 outputs the intensity-modulation signal obtained by differentially amplifying the binarized pulse-width-modulation signal or analog density signal which has been obtained as follows: a comparison is made between the reference signal and the analog density signal obtained by D/A-converting the image density data of 8-bit, for example, wherein the image density data is inputted synchronously with the pixel clock, and the obtained signal is binarized so that the pulse-width-modulation signal or analog density signal is obtained.

The LD drive circuit 400 makes the semiconductor laser LD oscillate in accordance with the modulation signal sent from the modulation circuit 300. The LD drive circuit 400 comprises: a photo-coupler type of semiconductor layer 410 composed of the semiconductor laser LD and photo-diode PD; an amplifying circuit 420 which amplifies the modulation signal at a predetermined amplification factor; a differential amplifier 430; and a D/A-converting circuit 440. In the manner described above, a feedback loop is formed, so that the amplification factor by the amplifying circuit 420 is stabilized and the electric current which flows in the semiconductor laser LD can be controlled to be a predetermined value, and at the same time the target value of the electric current which flows the semiconductor laser LD can be determined in accordance with the output voltage of the D/A-converting circuit 440.

In the case of the photo-coupler type of semiconductor laser 410, a photo-diode FD generates an electric current in accordance with the amount of light emitted by the semiconductor laser LD. Voltage according to the aforementioned electric current is generated by resistor R, and this voltage is inputted into the positive terminal of the differential amplifier 430. The electric potential difference between the voltage inputted into the positive terminal and the reference voltage inputted into the negative terminal of the differential amplifier 430 is fed back to the amplifying circuit 430, so that the amplification factor can be stabilized. The DC voltage impressed upon the negative terminal of the differential amplifier 430 corresponds to the target value of the electric current which flows in the semiconductor laser LD. This DC voltage is supplied from the D/A-converting circuit 440. In the manner described above, the LD drive circuit 400 feeds back the signal corresponding to the amount of light of the beam sent from the semiconductor LD so that the amount of light emitted by the semiconductor laser LD can become constant.

MPU 500 composes: a half decay exposure light amount detection means which detects half decay exposure light amount $P_{\frac{1}{2}}$; and an emitting light amount setting means which sets the amount of emitting light to 1.2–3.0 times of half decay exposure amount $P_{\frac{1}{2}}$. MPU 500 is also used as a charging voltage adjusting means which adjusts the output of the high voltage power unit 50 to predetermined voltage V0 according to the output signal of the electrometer 510.

The output voltage of a variable DC power source 440 can be adjusted according to the control signal sent from MPU 500. In the manner described above, the electric current which flows the semiconductor laser LD is changed so that the amount of light emitted by the laser can be adjusted to 1.2–2.5 times of half decay exposure light amount $P_{\frac{1}{2}}$.

The operation is explained as follows which is conducted when the amount of light of the beam illuminated on the surface of the high γ photoreceptor 1 is set, wherein the beam is sent from the optical scanning system 3.

FIG. 14 is a flow chart which shows the operation of the control circuit of the optical scanning system of this embodiment. FIG. 15(a) and FIG. 15(b) are graphs which shows the relation between the amount of exposure light of the beam illuminated by the optical scanning system 3 and the electric potential on the surface of the high γ photoreceptor, in which the intensity of laser beam is changed with respect to the exposed position on the surface of photoreceptor so that the exposure light amount is changed with respect to the exposed position on the surface of photoreceptor.

Since the intensity of laser beam has a predetermined relation with the driving electric current of the LD driving circuit, the exposure amount for each of the exposed position on the surface of photoreceptor is detected by the measurement of the driving electric current for each of the exposed position. Therefore, when the surface potential is measured for each of the exposed position and a half decay position on which half decay took place is detected, a half decay light amount $P_{\frac{1}{2}}$ is obtained by the driving electric current used for the half decay position.

When the main switch has been turned on, the image forming apparatus 100 is initialized in such a manner that: the rotating high γ photoreceptor is charged by the scorotron charger 2 and discharged by the discharger 11. While the aforementioned operation is conducted, MPU 500 detects charging potential $V_0$ of the image forming region on the high γ photoreceptor 1 through electric potential probe P and the electrometer 550, and adjusts the output of the high voltage power unit 50 so that charging voltage $V_0$ can be a predetermined value (S1).

When the index signal is inputted into the reading-out circuit 250, the index circuit 250 reads out a reference pattern data from the page memory 200 synchronously with the pixel clock and sends the data to the modulation circuit 300. The modulation circuit 300 sends the binarized pulse-width-modulation signal to the LD drive circuit 400, wherein the pulse-width-modualtion signal is obtained by comparing the reference signal and the analog reference pattern signal which has been obtained by D/A-converting the reference pattern data of 8 bits for example, which reference pattern data is inputted synchronously with the pixel clock. A black solid pattern composed of a predetermined region is used as this reference pattern. According to this analog reference pattern signal, the electric current which has been amplified by the amplifying circuit 420 at a predetermined amplification factor, continuously flows in the semiconductor laser LD. At this moment, MPU 500 changes stepwise the output voltage of the D/A-converting circuit 440 synchronously with the pixel clock. In the manner described above, the output current of the differential amplifier 430 can be changed stepwise, and the amount of light emitted by the semiconductor laser LD can be changed stepwise. The image region on the high γ photoreceptor 1 is illuminated with a beam, the exposure amount of which is changed stepwise as illustrated in FIG. 15(a). In the manner described above, a latent image pattern corresponding to the exposure intensity which changes as illustrated in FIG. 15(b), can be formed in the image forming region of the high γ photoreceptor 1 (S2).

MPU 500 measures the surface potential of the reference pattern through electric potential probe P and electrometer 510 (S3). MPU500 detects the position according to the outputted value where the surface potential is $\frac{1}{2} \times V_0$ and determines $P_{\frac{1}{2}}$ (S4). MPU 500 sets a value of predetermined times of $P_{\frac{1}{2}}$ as the output value of the D/A converting circuit 440 (S5). In the way described above, the output current from the amplifying circuit 420 can be determined. As explained above, in the present invention, the luminance of the beam illuminated on the high γ photoreceptor 1 by the optical scanning system 3 can be set to a predetermined value with regard to half decay exposure amount $P_{\frac{1}{2}}$, wherein the predetermined value is 1.2–2.5 times of $P_{\frac{1}{2}}$. In the aforementioned case, detection was conducted in such a manner that the value of $\frac{1}{2} V_0$ can be detected. However, the position where the absolute value of the differential value of the output may be determined to be $P_{\frac{1}{2}}$.

In this example, the operation to determine the amount of light is carried out before a series of image forming processes such as charging, exposure and development are conducted, and the aforementioned operation is carried out at each image forming process.

The present invention is not limited to the aforementioned manner. The operation to determine the amount of light may be carried out at each time when a predetermined number of image formation have been performed. It may be carried out when it is predicted from a statistic viewpoint that the fluctuation of light sensitivity of the photoreceptor will occur.

As described above, in this embodiment, an image of stable quality could been formed without being affected by the fluctuation of light sensitivity of the high γ photoreceptor 1 caused by the change of environmental factors, by the image forming apparatus 100 in which image formation is conducted as follows. A latent image is formed by illuminating the high γ photoreceptor 1 with a modulated beam sent from the optical scanning system 3, wherein the photoreceptor 1 has a light decay characteristic which is characterized in that: when the amount of light is small, the light decay of charging potential $V_0$ is not so sensitive that the potential is hardly decayed; and when the amount of light exceeds the aforementioned small amount region, the charging potential is sharply decayed. After the latent image has been formed, reversal development is conducted. The aforementioned image forming apparatus 100 comprises: electric potential probe P and the electrometer 510 which are used as a half decay exposure light amount detecting means which detects half decay exposure light amount $P_{\frac{1}{2}}$ by which surface potential $V_0$ of the aforementioned photoreceptor 1 is decreased to $\frac{1}{2}$; MPU 500 and the D/A-converting circuit 440 which are used as an emitting light amount setting means which sets the amount of light emitted by semiconductor laser LD to a predetermined value according to the result of detection conducted by the aforementioned electrometer 510.

The aforementioned MPU 500 and D/A-converting circuit 440 which are used as an emitting light amount setting means, make the maximum light amount $I_0$ and the half decay exposure amount $P_{\frac{1}{2}}$ to satisfy the following inequality so that a latent image is formed on the aforementioned photoreceptor and the latent image is reversaly developed so that a stable image can be formed without being affected by the change of sensitivity of the photoreceptor caused by the fluctuation of environmental factors:

$$1.2 \times P_{\frac{1}{2}} \leq I_0 \leq 2.5 \times P_{\frac{1}{2}}$$

where $I_0$ is the maximum light amount in the distribution of the amount of light of the beam illuminated on the high γ photoreceptor 1 which has been uniformly charged, and $P_{\frac{1}{2}}$ is the half decay exposure amount which reduces the electric potential of the aforementioned photoreceptor 1. It is shown that a high density recording can be carried out by the dot diameter formed by this exposure intensity using the same optical scanning system even in the case of conventional Se and OPC, when the exposure conditions are set to the aforementioned ones.

In this embodiment, an electrometer is used to detect $P_{\frac{1}{2}}$. However, the present invention is not limited to the electrometer, and it is possible to use a reference toner image. For example, in FIG. 11, a reference toner image is developed by the black toner developing unit 7a, and the output is detected by reflection density sensor S. Then, the position where the reflection density becomes a specific density or the position where the absolute value of differentiation becomes maximum, is defined as $P_{\frac{1}{2}}$.

The image forming apparatus of the present invention in which a latent image is formed by illuminating on the surface of a high γ photoreceptor with a modulated beam sent from an optical scanning system and the formed latent image is reversaly developed, comprises: a half decay exposure light amount detecting means which detects half decay light amount $P_{\frac{1}{2}}$ to reduce surface potential $V_0$ of the aforementioned photoreceptor to ½; and an emitting light amount setting means which sets the amount of light of the laser beam emitted by a semiconductor, to a predetermined value according to the results of the detection conducted by the aforementioned half decay exposure amount detection means. Therefore, the present invention can provide an image forming apparatus which can form an image of stable quality without being affected by the change of light sensitivity of a high γ photoreceptor which is caused by the fluctuation of environmental factors.

The aforementioned emitting light amount setting means is characterized in that: the light amount is set to 1.2–3.0 times of half decay exposure light amount $P_{\frac{1}{2}}$.

What is claimed is:

1. A method of forming an image on an imaging surface of a photoreceptor having a light decay characteristic, wherein:

when an amount of exposure of said imaging surface to a light beam emitted from a light source is smaller than a given critical value, a potential of said photoreceptor decays slowly from a predetermined potential; and when the amount of exposure of said imaging surface to said light beam from said light source is larger than said given critical value, the potential of said imaging surface decays rapidly from said predetermined potential;

the method comprising:

(1) adjusting an amount of light of said light beam emitted from said light source, including the steps of:

(a) charging said imaging surface of said photoreceptor to a predetermined potential;

(b) exposing a plurality of points on said charged imaging surface of said photoreceptor with different amounts of light of said light beam emitted by said light source, by varying said amount of light of said light beam;

(c) detecting from said plurality of exposed points, a half decay exposure light amount $P_{\frac{1}{2}}$, that represents a potential of said imaging surface of said photoreceptor that has been reduced from an initial potential value to a half value of said initial potential value; and (d) varying a maximum light amount $I_0$, on the basis of said detected half decay exposure light amount $P_{\frac{1}{2}}$, of said light beam, in a light amount distribution thereof on said imaging surface of said photoreceptor, that satisfies the following relationship:

$$1.2 \times P_{\frac{1}{2}} \leq I_0 \leq 2.5 \times P_{\frac{1}{2}}$$

and then (2) forming an image on said imaging surface, including the steps of:

(e) charging said imaging surface of said photoreceptor to said predetermined potential; and (f) exposing said charged imaging surface of said photoreceptor with an image light that is generated by modulating said light beam, said image light being adjusted to have said maximum light amount $I_0$, in accordance with an image to be formed.

2. The method of claim 1, wherein said light beam is a pulse width modulated light beam.

3. The method of claim 1, wherein:

said step of detecting said half decay exposure light amount $P_{\frac{1}{2}}$ comprises measuring a potential of each of said plurality of exposed points on said imaging surface of said photoreceptor.

4. The method of claim 1, wherein:

said step of varying a maximum light amount of said light beam comprises developing said plurality of exposed points with toner; and said step of detecting said half decay exposure light amount $P_{\frac{1}{2}}$ comprises measuring an amount at toner of each of said plurality of exposed points on said imaging surface of said photoreceptor.

5. A method of forming an image on a photoreceptor having a light decay characteristic, wherein:

when an amount of exposure of a light beam is smaller than a predetermined amount of exposure, a potential of said photoreceptor decays slowly; and when the amount of exposure of said light beam is larger than said predetermined amount of exposure, the potential of said photoreceptor decays rapidly;

the method comprising:

(1) adjusting an amount of exposure $I_0$, of said light beam, including the steps of:

(a) charging said photoreceptor to a predetermined potential;

(b) exposing a plurality of points on said charged photoreceptor with different amounts of exposure of said light beam, by varying said amounts of exposure of said light beam;

(c) measuring a potential of each of said plurality of exposure points so as to detect said light decay characteristic of said photoreceptor; and (d) varying said amount of exposure $I_0$, of said light beam on the basis of said detected light decay characteristic;

and then (2) forming the image on said photoreceptor, including the steps of:

(e) charging said photoreceptor to a predetermined potential;

(f) exposing said charged imaging surface of said photoreceptor with an image light that is generated by modulating said light beam, said image light being adjusted to have said maximum light amount Io, in accordance with an image to be formed.

6. The method of claim 5, wherein said light beam is a pulse width modulated beam.

7. The method of claim 5, wherein:

said measuring step measuring a potential of each of said plurality of exposure points so as to detect said light decay characteristic of said photoreceptor comprises detecting a half decay amount of exposure $P_{\frac{1}{2}}$ as said light decay characteristic of said photoreceptor, which represents a potential value on said photoreceptor that has been reduced from an initial potential value to a half value of said initial potential value, by measuring said plurality of exposure points on said photoreceptor; and said varying step varying said amount of exposure $I_0$, of said light beam on the basis of said detected light decay characteristic comprises varying said maximum amount of exposure $I_0$ of said light beam on the basis of said half decay amount of exposure $P_{\frac{1}{2}}$ so as to satisfy the following relationship:

$$1.2 \times P_{\frac{1}{2}} \leq I_0 \leq 2.5 \times P_{\frac{1}{2}}$$

8. A method of forming an image on a photoreceptor having a light decay characteristic, wherein:

when an amount of exposure of a light beam is smaller than a predetermined amount of exposure, a potential of said photoreceptor decays slowly; and when the amount of exposure of said light beam is larger than said predetermined amount of exposure, the potential of said photoreceptor decays rapidly;

the method comprising:

(1) adjusting an amount of exposure $I_0$ of said light beam, including the steps of:

(a) charging said photoreceptor to a predetermined potential;

(b) exposing a plurality of points on said charged photoreceptor with different amounts of exposure of said light beam, by varying said amounts of exposure of said light beam;

(c) developing each of said plurality of exposure points on said photoreceptor with toner;

(d) measuring an amount of toner at each of said plurality of exposure points so as to detect said light decay characteristic of said photoreceptor; and (e) varying said amount of exposure $I_0$ of said light beam on the basis of said detected light decay characteristic;

and then (2) forming the image on said photoreceptor, including the steps of:

(f) charging said photoreceptor to a predetermined potential;

(g) exposing said charged imaging surface of said photoreceptor with an image light that is generated by modulating said light beam, said image light being adjusted to have said maximum light amount Io, in accordance with an image to be formed.

9. The method of claim 8, wherein said light beam is a pulse width modulated beam.

10. The method of claim 8, wherein:

said measuring step measuring an amount of toner at each of said plurality of exposure points so as to detect said light decay characteristic of said photoreceptor comprises detecting a half decay amount of exposure $P_{\frac{1}{2}}$ as said light decay characteristic of said photoreceptor, which represents a potential value on said photoreceptor that has been reduced from an initial potential value to a half value of said initial potential value, by measuring said plurality of exposure points on said photoreceptor; and said varying step varying said amount of exposure $I_0$ of said light beam on the basis of said detected light decay characteristic comprises varying said maximum amount of exposure $I_0$ of said light beam on the basis of said half decay amount of exposure $P_{\frac{1}{2}}$ so as to satisfy the following relationship:

$$1.2 \times P_{\frac{1}{2}} \leq I_0 \leq 2.5 \times P_{\frac{1}{2}}.$$

* * * * *